(12) United States Patent
Watanabe

(10) Patent No.: US 9,300,630 B2
(45) Date of Patent: Mar. 29, 2016

(54) RELAY APPARATUS, INFORMATION PROCESSING SYSTEM AND METHOD

(71) Applicant: Taichi Watanabe, Kanagawa (JP)

(72) Inventor: Taichi Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 63 days.

(21) Appl. No.: 14/198,815

(22) Filed: Mar. 6, 2014

(65) Prior Publication Data
US 2014/0280456 A1    Sep. 18, 2014

(30) Foreign Application Priority Data

Mar. 15, 2013    (JP) ................................. 2013-052717

(51) Int. Cl.
*H04L 29/08*     (2006.01)
*H04L 29/06*     (2006.01)

(52) U.S. Cl.
CPC ............. *H04L 63/02* (2013.01); *H04L 67/06* (2013.01); *H04L 67/2857* (2013.01)

(58) Field of Classification Search
CPC .................................................. H04L 67/2833
USPC ........................................ 709/202, 217, 219
See application file for complete search history.

(56) References Cited

U.S. PATENT DOCUMENTS

| 6,012,083 | A | 1/2000 | Savitzky et al. |
| 9,037,484 | B2 * | 5/2015 | Walters ............... G06F 17/3053 705/14.49 |
| 2004/0002895 | A1 * | 1/2004 | Asari et al. ...................... 705/13 |
| 2006/0218357 | A1 * | 9/2006 | Shimada ............... G06F 3/0611 711/150 |
| 2012/0110183 | A1 * | 5/2012 | Miranda et al. ............... 709/226 |
| 2013/0191466 | A1 * | 7/2013 | Perlow et al. ................. 709/206 |

(Continued)

FOREIGN PATENT DOCUMENTS

| JP | 10-116295 | 5/1998 |
| JP | 2004-046681 | 2/2004 |

(Continued)

OTHER PUBLICATIONS

"Reliability and Relay in Peer-to-Peer Communication Systems"—Baset et al, Columbia Univ., Department of Computer Science, Dec. 2010 http://www.cs.columbia.edu/~salman/publications/rel-iptcomm10.pdf.*

*Primary Examiner* — Randy Scott
(74) *Attorney, Agent, or Firm* — Oblon, McClelland, Maier & Neustadt, L.L.P.

(57) ABSTRACT

An information processing system includes a request receiver to receive a terminal request including a plurality of apparatus identification information, transmitted from communication terminals, used for identifying each of the plurality of apparatuses; a request processor to accumulate the received terminal request into a request accumulation unit; a request transmitter, upon receiving an obtaining request for obtaining a terminal request from an apparatus identified by the apparatus identification information, to transmit the terminal request accumulated in the request accumulation unit to the apparatus; a result receiver to receive a process result for the terminal request from the apparatus; and a result transmitter to transmit the received process result to a communication terminal. The request processor transfers the terminal request from one request accumulation unit of one apparatus transmitting a process result to other request accumulation unit of other apparatus not transmitting a process result.

10 Claims, 15 Drawing Sheets

(56) References Cited

U.S. PATENT DOCUMENTS

2013/0212163 A1 8/2013 Shimomoto
2013/0268624 A1 10/2013 Yagiura

FOREIGN PATENT DOCUMENTS

JP 2009-265919 11/2009
JP 2013-254404 12/2013

* cited by examiner

```
SERVER ID              : aaa
RELATED SERVER ID      : bbb
IP ADDRESS             : 192.168.0.2
ADDRESS OF RELAY SERVER : relay.test.co.jp
PASSWORD               : 0123456789
```

FIG. 17

| HEADER | |
|---|---|
| URL | : https://relay.test.co.jp/upload&= SHARED FOLDER |
| SERVER ID | : aaa |
| RELATED SERVER ID | : bbb |
| RELATED SERVER ID | : ccc |
| VERIFICATION INFORMATION | : USER NAME, PASSWORD |

BODY

UPLOAD DATA

RELAY APPARATUS, INFORMATION PROCESSING SYSTEM AND METHOD

CROSS-REFERENCE TO RELATED APPLICATION

This application claims priority pursuant to 35 U.S.C. §119 to Japanese Patent Application No. 2013-052717, filed on Mar. 15, 2013 in the Japan Patent Office, the disclosure of which is incorporated by reference herein in its entirety.

BACKGROUND

1. Technical Field

The present invention relates to a relay apparatus to relay communication between a plurality of apparatuses and at least one communication terminal connected to different networks, an information processing system, and a computer-readable program storing a program controlling relaying communication between apparatuses and at least one terminal.

2. Background Art

In homes and companies, local networks, independent of a global network such as the Internet, are configured to communicate data safely within the homes and companies. These local networks may include, for example, a fire wall as security measures to prohibit a direct access to the local networks from the global network, in which an access from the global network to the local networks is restricted such as prohibited.

With the wide use of portable terminals such as smart phones, there is a demand to access the in-house local networks from the global network to use information stored in the offices outside.

FIG. 1 shows one configuration to achieve such demand. FIG. 1 shows a network environment composed of a global network 10 and a local network 11 in which a fire wall 12 is disposed between the global network 10 and the local network 11. The fire wall 12 could be software, hardware or a combination of software and hardware that controls communication between a specific network and an external environment such as external network to protect safety of apparatuses connected to the specific network.

In the network environment of FIG. 1, a portable terminal 13 is connect-able to the global network 10, and a file server 14 for storing and managing files is connected to the local network 11. Further, the global network 10 is connected to a file server 15 provided with a large memory space to store and manage a large number of files.

In the configuration of FIG. 1, the files stored in the file server 14 can be copied and stored in the file server 15. The portable terminal 13 can access the file server 15 via a base station 16 to access such copies of files.

However, in the configuration of FIG. 1, information is stored on the global network 10, which is vulnerable to security attacks. Therefore, instead of the file server 15, a relay server 17 can be disposed as shown in FIG. 2.

The relay server 17 relays communication between the portable terminal 13 and the file server 14. Therefore, the relay server 17 receives a request from the portable terminal 13 and transmits the received request to the file server 14 on the local network 11. Then, the relay server 17 receives a process result from the file server 14 and transmits the process result to the portable terminal 13.

FIG. 3 illustrates a system configuration having the relay server 17 disposed on a network system in which files in the portable terminal 13 are uploaded to a plurality of servers such as file servers 14 and 18. The relay server 17 is connected to the global network 10, and further, a local network 11a of an entity (office or site) A, a local network 11b of an entity B, and a 3G line 19 as are connected to the global network 10. The 3G line 19 is a communication network for portable phones.

Further, fire walls 12a, 12b and 12c are disposed between the global network 10 and the local networks 11a and 11b, and the 3G line 19 as security measures. The file server 14 is connected to the local network 11a, the file server 18 is connected to the local network 11b, and the portable terminal 13 is connected to the 3G line 19 via the base station 16.

In this system configuration, the user may upload the file to the file servers as follows. (1) The portable terminal 13 is connected to the file server 14 via the relay server 17. (2) A file in the portable terminal 13 is transmitted to the file server 14 via the relay server 17. (3) The portable terminal 13 is disconnected from the file server 14, and the portable terminal 13 is connected to the file server 18 via the relay server 17. (4) A file in the portable terminal 13 is transmitted to the file server 14 via the relay server 18.

However, in this system configuration, the user may need to conduct a connection process to each one of file servers using the portable terminal and then transmits a file, which is not so convenient for the user due to such user operations.

SUMMARY

In one aspect of the present invention, an information processing system including a plurality of apparatuses connectable via different networks is devised. The information processing system includes a request receiver to receive a terminal request including a plurality of apparatus identification information, transmitted from a communication terminal, the apparatus identification information being used for identifying each of the plurality of apparatuses; a request processor to accumulate the received terminal request into one of a plurality of request accumulation units that corresponds to one of the apparatus identification information included in the terminal request; a request transmitter to, in response to receiving an obtaining request for obtaining a terminal request from an apparatus identified by the apparatus identification information, transmit the terminal request accumulated in the request accumulation unit to the apparatus; a result receiver to receive a process result of the terminal request from the apparatus; and a result transmitter to transmit the received process result to the communication terminal. Among the plurality of apparatus identification information included in the terminal request, the request processor transfers the terminal request from a first request accumulation unit corresponding to apparatus identification information of a first apparatus, from which a process result is received, to a second request accumulation unit corresponding to apparatus identification information of a second apparatus, from which a process result is not yet received.

In another aspect of the present invention, a relay apparatus for relaying communication between a plurality of apparatuses and a plurality of communication terminals connectable via different networks is devised. The relay apparatus includes a request receiver to receive a terminal request including a plurality of apparatus identification information, transmitted from the communication terminals, used for identifying each of the plurality of apparatuses; a request processor to accumulate the received terminal request into a request accumulation unit corresponding to one of the plurality of apparatus identification information included in the terminal request; a request transmitter, upon receiving an obtaining request for obtaining a terminal request from an apparatus identified by the apparatus identification information, to transmit the terminal request accumulated in the request accumulation unit to the apparatus; a result receiver to receive a process result for the terminal request from the apparatus; and a result transmitter to transmit the received process result to the communication terminals, Among the plurality of apparatus identification information included in the terminal request, the request processor transfers the terminal request from a first request accumulation unit corresponding to apparatus identification information of a first apparatus, from which a process result is received to a second request accumulation unit corresponding to apparatus identification information of a second apparatus, from which a process result is not yet received.

In another aspect of the present invention, a method of relaying communication between a plurality of apparatuses and a plurality of communication terminals connectable via different networks is devised. The method includes the steps of receiving a terminal request including a plurality of apparatus identification information, transmitted from the communication terminals, used for identifying each of the plurality of apparatuses (receiving step); accumulating the received terminal request into a request accumulation unit corresponding to one of the apparatus identification information included in the terminal request (accumulating step); transmitting the terminal request accumulated in the request accumulation unit, upon receiving an obtaining request for obtaining a terminal request from an apparatus identified by the apparatus identification information, to the apparatus (first transmitting step); receiving a process result for the terminal request from the apparatus (receiving step); transmitting the received process result to at least one of the communication terminals (second transmitting step); and transferring the terminal request from a first request accumulation unit corresponding to apparatus identification information of a first apparatus, from which a process result is received, to a second request accumulation unit corresponding to apparatus identification information of a second apparatus, from which a process result is not yet received, among the plurality of apparatus identification information included in the terminal request, (transferring step).

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 16 is a sequential chart of uploading files to a plurality of file servers a plurality of file servers; and.

FIG. 17 is an example of contents of upload request when uploading to a plurality of file servers The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

Figure 1:
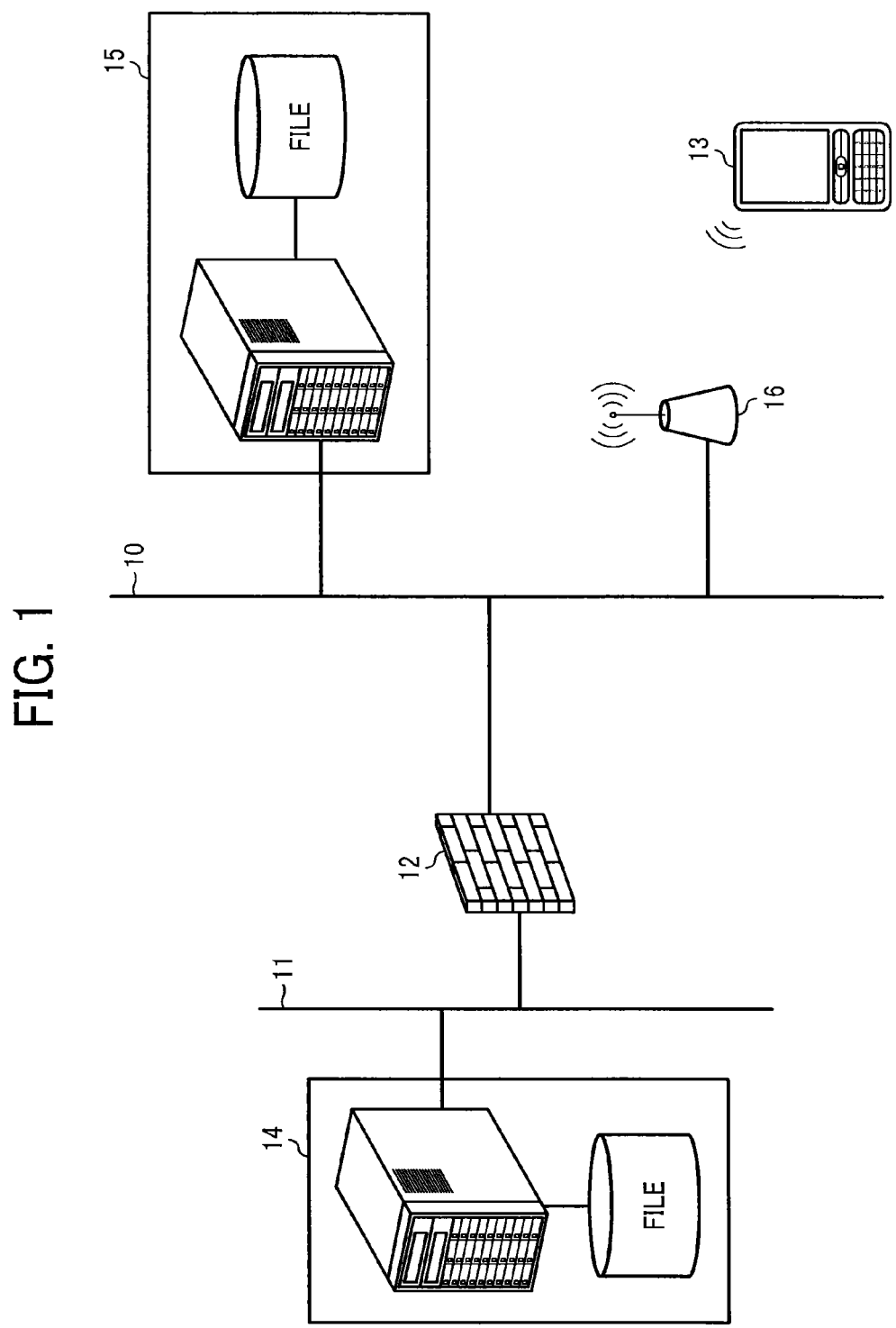
FIG. 1 is a schematic configuration of one system for accessing files on apparatuses from an external network, according to the related art.
Figure 2:
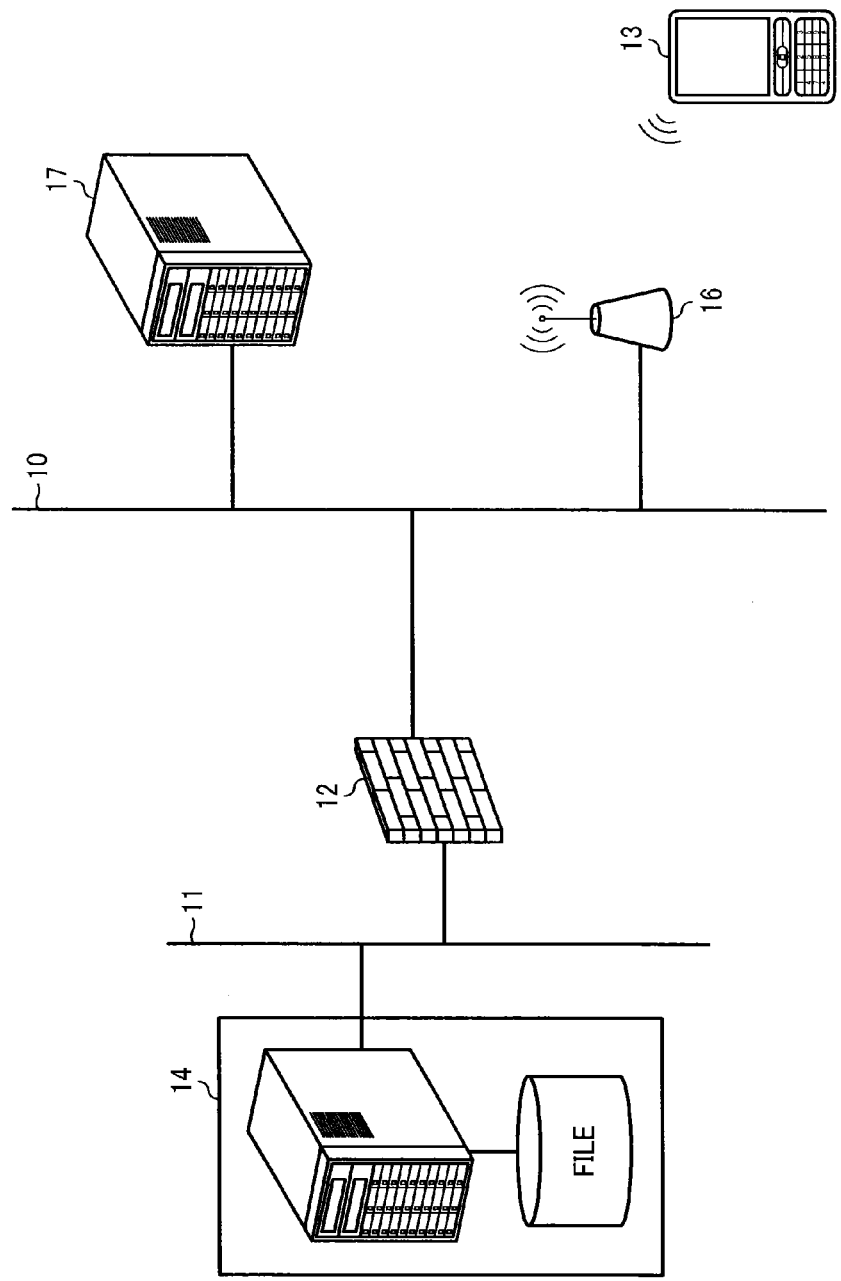
FIG. 2 is a schematic configuration of another system of accessing files on apparatuses from an external network, according to the related art.
Figure 3:
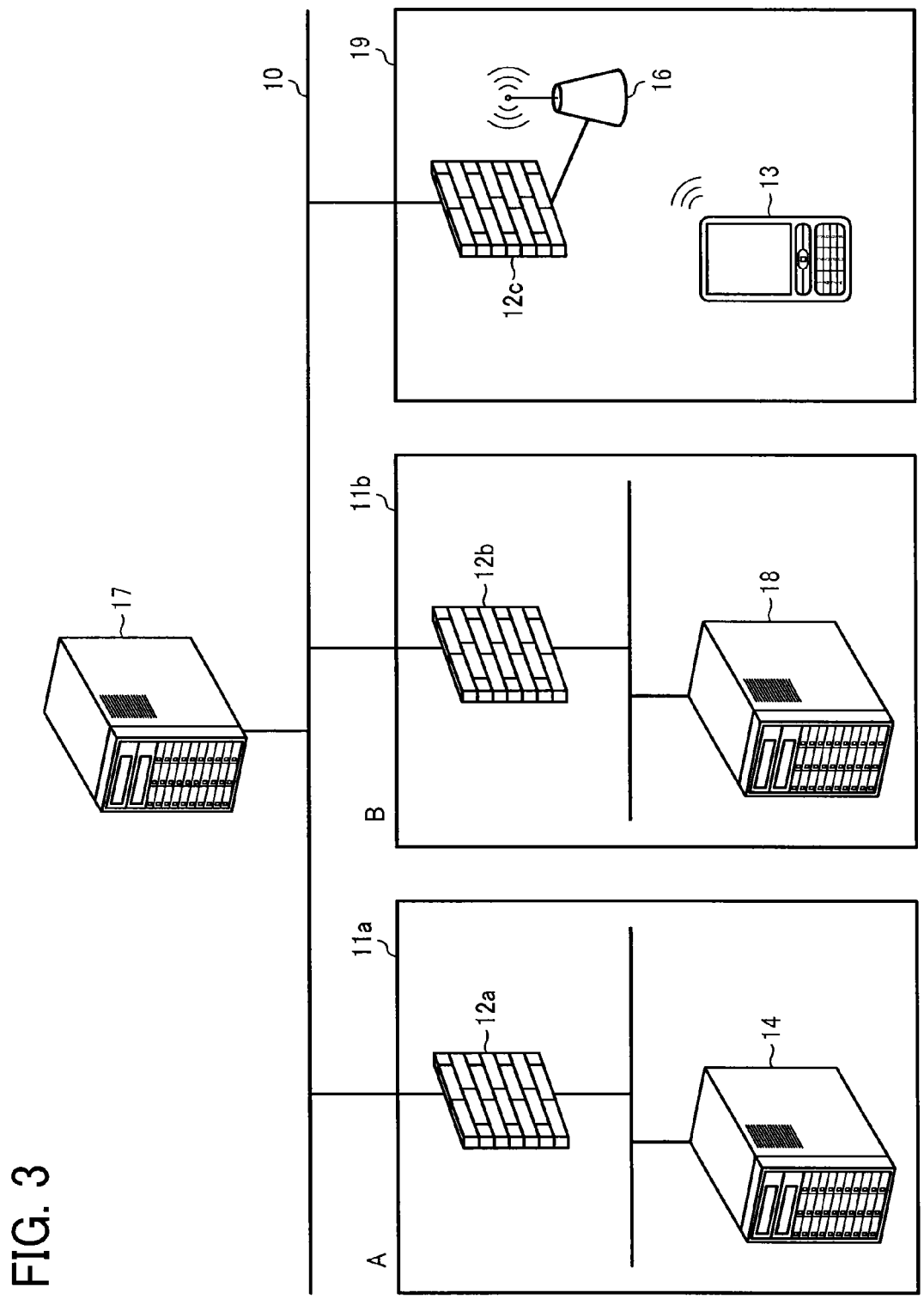
FIG. 3 is a schematic configuration of system for uploading files to conventional two apparatuses.

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that have the same function, operate in a similar manner, and achieve a similar result.

Referring now to the drawings, a description is given of an apparatus or system for an information processing system according to an example embodiment.

Figure 4:
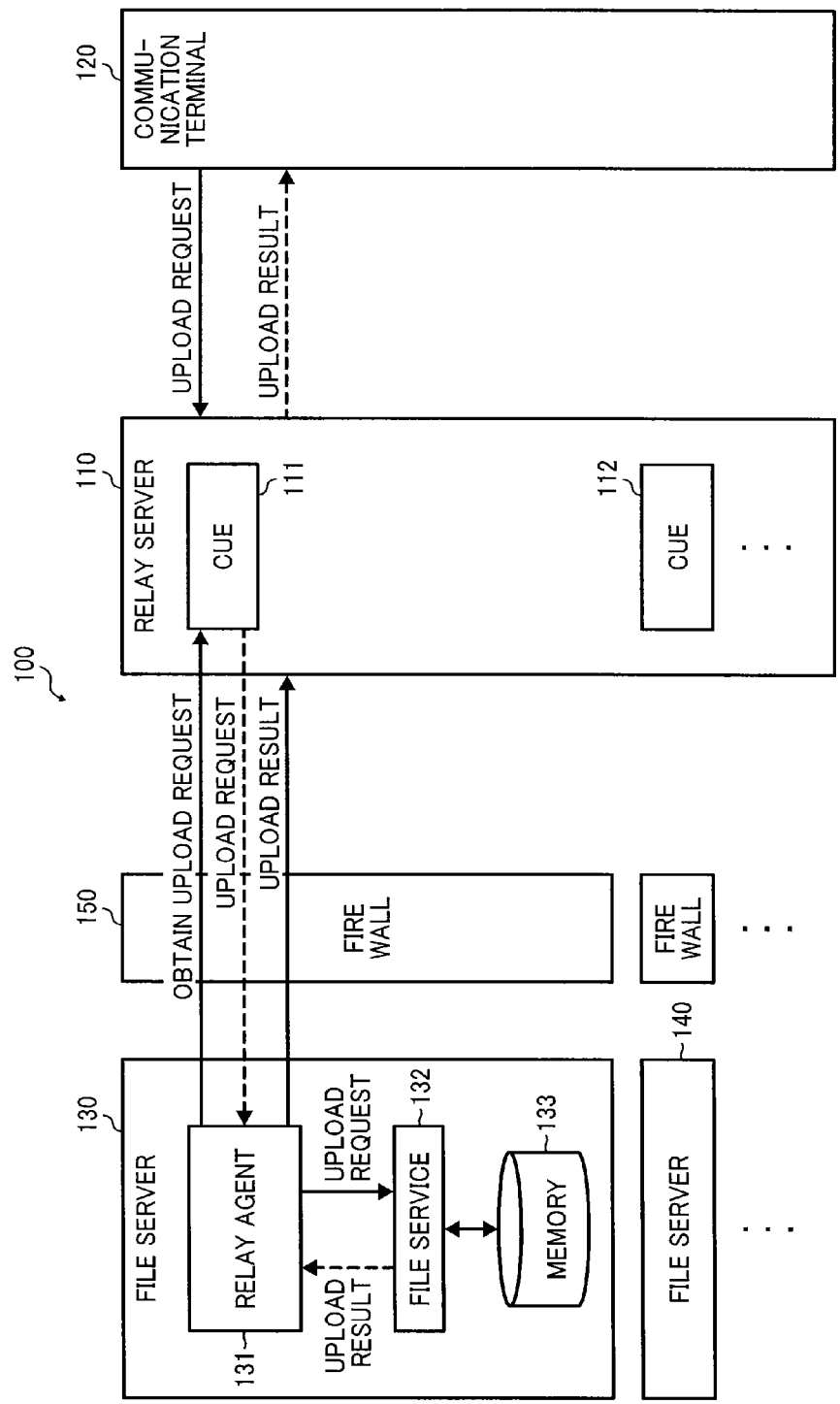
FIG. 4 is a schematic configuration of an information processing system according to an example embodiment.

FIG. 4 is a schematic configuration of an information processing system according to an example embodiment. An information processing system 100 shown in FIG. 4 is connected to a global network, and a plurality of local networks. The global network is a wide area communication network such as the Internet, which can be accessed from other networks freely. The local network is a localized network such as a local area network (LAN), and access to the local network from other networks is restricted.

A relay server 110 and a communication terminal 120 can be connected to the global network. The relay server 110 and the communication terminal 120 can be connected to the global network wirelessly or wired. When the relay server 110 and communication terminal 12 are connected to the global network wirelessly, the relay server 110 and communication terminal 12 can be connected to the global network using 3G line, wireless LAN, Bluetooth (registered trademark) or the like.

A file server 130 is connected to one of a plurality of the local networks. The file server 130 includes a relay agent 131, a file service 132 and a memory 133. The relay agent 131 can communicate with the relay server 110.

A file server 140, having the same or similar configuration of the file server 130, is connected to other local network. Further, another file server, having the same or similar configuration of the file server 130, is connected another local network.

The information processing system 100 may be configured with a plurality of apparatuses such as the relay server 110, the communication terminal 120, and the plurality of file servers 130 and 140.

FIG. 4 shows one configuration that the file server 130 includes the relay agent 131, the file service 132 and the memory 133, but the file service 132 and the memory 133 can be disposed in other apparatus, in which the other apparatus is connected to the same local network that the file server 130 is connected.

Each of the local networks is connected to the global network via a communication regulation apparatus such as a fire wall 150 to regulate access from other local networks.

The communication terminal 120 transmits a terminal request) to a plurality of apparatuses. The terminal request is, for example, an upload request to upload a file, stored in the communication terminal 120, to the file server 130 and the file server 140. The upload request is one example of the terminal request, and the terminal request is not limited hereto.

The terminal request includes apparatus identification information such as file server identifier to identify apparatuses such as the file server 130 and the file server 140. Further, if the terminal request is the upload request, the upload request includes one or more uploading files. The uploading file is, for example, an image file such as JPG file. The file server identifier may be characters, symbols, numerals, and a combination of thereof.

Further, the terminal request may include address of the communication terminal 120. The address of the communication terminal 120 is used to return a process result from the apparatus such as the file server 130 and the file server 140 to the communication terminal 120 as a response to the terminal request. The address may be, for example, internet protocol (IP) address but not limited hereto.

The communication terminal 120 includes a memory and a central processing unit (CPU). The memory stores applications, operating system (OS), firmware, various data or the like used for generating various terminal requests. The CPU reads out the application or the like from the memory and executes the application or the like. Further, the communication terminal 120 includes a network interface (I/F) connectable to the global network. Further, the communication terminal 120 may include an input device to input data, a display unit to display information, an audio input device to input audio, and an audio output device to output audio. Further, the communication terminal 120 may include a capturing device such as a camera to capture images. The communication terminal 120 is, for example, a notebook personal computer (PC), a tablet PC, a personal digital assistant (PDA), a smart phone, a game machine or the like.

The relay server 110 relays the terminal request from the communication terminal 120 to the file server 130 and/or the file server 140, and relays a process result of the terminal request from the file server 130 and/or the file server 140 to the communication terminal 120, which means the relay server 110 functions as a relay apparatus.

The relay server 110 includes cues 111 and 112 for each of file servers as a request accumulation unit, wherein the cue 111 is corresponded to the file server 130 and the cue 112 is corresponded to the file server 140, and the cues are used to transmit the terminal request to a plurality of apparatuses such as the file servers 130 and 140. FIG. 4 shows the cue 111 used for the file server 130 and the cue 112 used for the file server 140.

Upon receiving the upload request from the communication terminal 120, the relay server 110 extracts a file server identifier included in the received upload request, and the relay server 110 selects the file server identifier, and puts the upload request having the selected file server identifier to a corresponding cue such as the cue 111, and accumulates the upload request in the cue. The cues 111 and 112 may be, for example, first-in-first-out (FIFO) cue. Each of the cues 111 and 112 is assigned with the file server identifier of the file servers 130 and 140 respectively.

Therefore, when the relay server 110 receives an obtaining request to obtain the terminal request from the corresponding file server 130, the relay server 110 can extract the terminal request from the cue 111 for the file server 130, and can transmit the terminal request.

File servers such as the file server 130 and the file server 140 can store various files, read out files based on a terminal request, and write files. In this description, an example of using file server is described, but not limited to the file server. For example, personal computers (PCs), multi-functional peripherals (MFPs), printers or the like can be used. Because a plurality of file servers can use the same configuration used for the file server 130, only the file server 130 is described as an example of file server.

The relay agent 131 of the file server 130 conducts communication with the relay server 110. When the relay agent 131 receives the terminal request, and the relay agent 131 instructs a given processing for the terminal request to the file service 132. Upon receiving the instruction from the relay agent 131, the file service 132 conducts a given processing such as reading out a requested file or writing a file, and generates a process result. The memory 133 stores and retains files. The relay agent 131 transmits the process result generated by the file service 132 to the relay server 110.

For example, if the terminal request is a request for uploading and storing a file, the file service 132 stores the received file in the memory 133. Then, the file service 132 generates a message that the file is correctly stored as a process result.

The file server 130 can convert a file prepared by using a document application and a presentation application to an image file such as JPG file. Therefore, even if the communication terminal 120 uses a platform that cannot print a file prepared by the document application and the presentation application, the concerned file can be printed.

The relay server 110, and the file servers 130 and 140 may employ a similar hardware configuration including a memory to store various data, files, and programs, and a central processing unit (CPU) to read programs from the memory and executes the programs. By executing the programs using the CPU, processing at each of the servers can be conducted. For example, in case of the relay server 110, the relay server 110 conducts a relay operation to relay a terminal request and a process result between apparatuses such as between the communication terminal 120 and the file servers 130 and 140. In case of the file servers 130 and 140, the CPU may function as the relay agent 131 and the file service 132, and the CPU conducts processing conducted by the above mentioned relay agent and file service.

The relay server 110, and the file servers 130 and 140 can also include an input device such as a keyboard and a mouse for inputting data, and a display unit such as a display and a screen for displaying information. Further, other file servers may employ a similar hardware configuration of the file servers 130 and 140.

Figure 5:
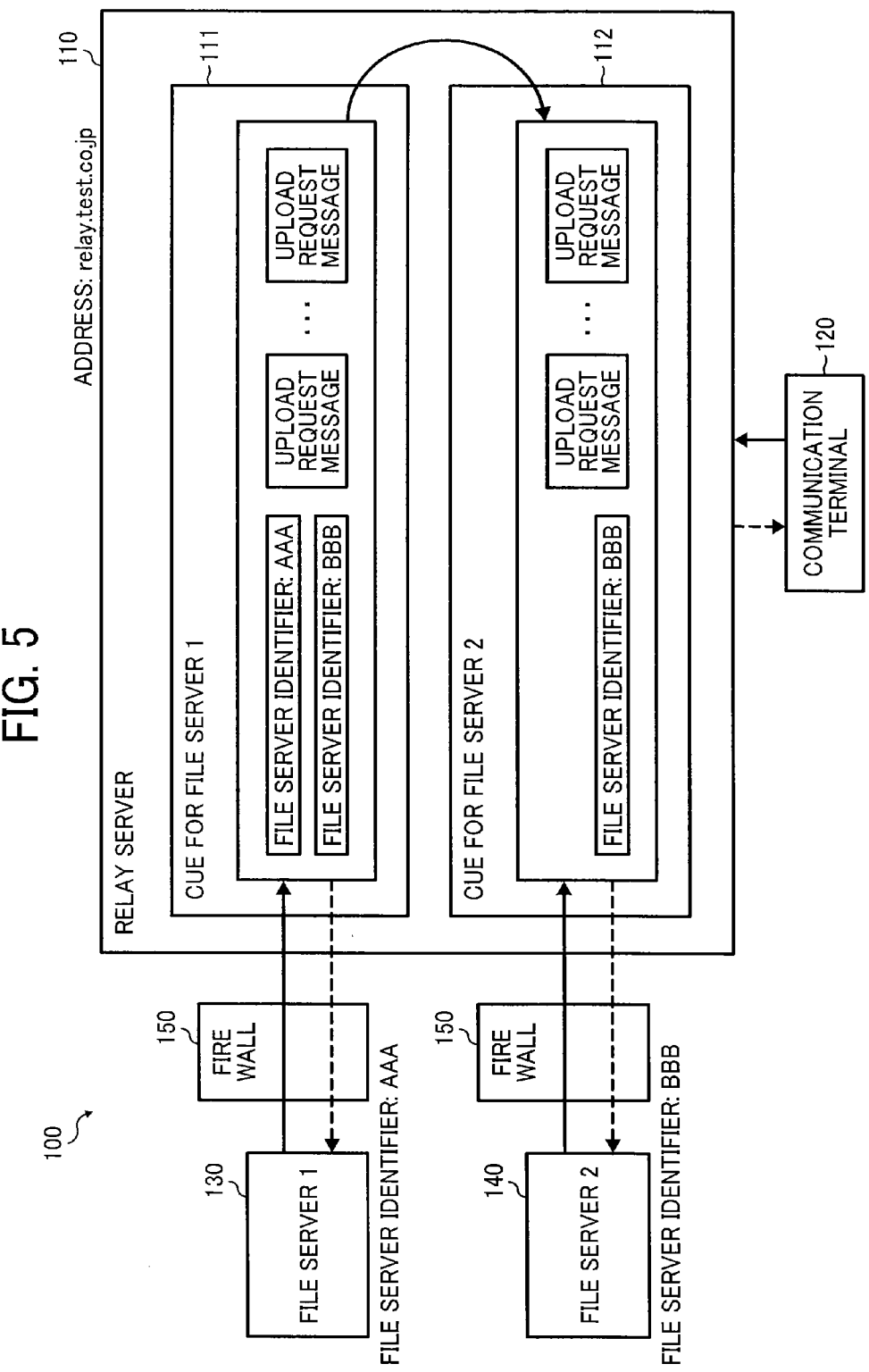
FIG. 5 is a schematic configuration of the information processing system when files are uploaded to a plurality of file servers.

A description is given of uploading files to a plurality of file servers 130 and 140 with FIG. 5, which schematically shows processing conduct-able by the relay server 110 when uploading files to a plurality of file servers 130 and 140.

An upload request includes one or more upload request messages, and file server identifiers of the file servers 130 and 140. The upload request message includes a statement that file storing is to be conducted as a process, information of storing destination of file to be transmitted with the upload request message, and file names to be stored. Upon receiving the upload request from the communication terminal 120, the relay server 110 extracts file server identifiers included in the upload request. In this example case, a file server identifier of the file server 130 is set as "aaa," and a file server identifier of the file server 140 is set as "bbb."

The relay server 110 puts the upload request to one of the cues 111 and 112 set for file servers identified by the extracted file server identifier. If the number of file server identifiers is two, the upload request is put into one of the two cues identified by the corresponding two file server identifiers.

If the terminal request includes server ID and related server ID to be described later, the upload request is put into a cue corresponding to the server ID.

However, the configuration is not limited hereto. For example, when file servers or cues are assigned with numbers, upload requests can be put in the order of numbers such as from the smallest number to the greatest number. Further, when file servers or cues are assigned with alphabets in stead of numbers, upload requests can be put in the order of alphabets such as A, B, C . . . . The order of numbers or alphabets can be set in advance.

The upload request put in one cue such as the cue 111 is accumulated in the cue 111 until the upload request put is transmitted to the corresponding file server 130. The corresponding file server 130 transmits an obtaining request for obtaining a terminal request to the relay server 110, for example, periodically. Therefore, the relay server 110 responds to the obtaining request, and transmits the upload request accumulated in the cue 111 used for the file server 130 to the file server 130.

Similarly the file server 140 also transmits an obtaining request to the relay server 110 periodically. However, at this stage, if a terminal request from 他の other communication terminal is not put in the cue 112 used for the file server 140, the cue 112 does not include the terminal request, in which the relay server 110 transmits nothing.

The file server 130 conducts processing based on an upload request message included in the received upload request, and generates a process result. Then, the file server 130 transmits the process result to the relay server 110.

Upon receiving the process result from the file server 130, the relay server 110 deletes the file server identifier of the file server 130 included in the upload request.

Then, the relay server 110 transfers the upload request from the cue 111 to the cue 112, in which among file server identifiers included in the upload request, a file server identifier which does not receive a process result is transferred to the cue 112.

Because the file server identifier "aaa" of the file server 130 is deleted as above described, the upload request stored in the cue 112 includes only the file server identifier "bbb" of the file server 140. The file server 140 transmits an obtaining request to the relay server 110. Upon obtaining a upload request from the relay server 110, the file server 140 conducts processing based on the upload request message included in the upload request, and generates a process result. Then, the file server 140 transmits the process result to the relay server 110.

Upon completing this processing, the file server identifier "bbb" of the file server 140 is also deleted. With this deletion, the upload request does not include any file server identifier, which means destination for uploading the file does not exist, and therefore the relay server 110 deletes this upload request. Then, the relay server 110 transmits the process result to the communication terminal 120, and ends the processing for this upload request.

Figure 6:
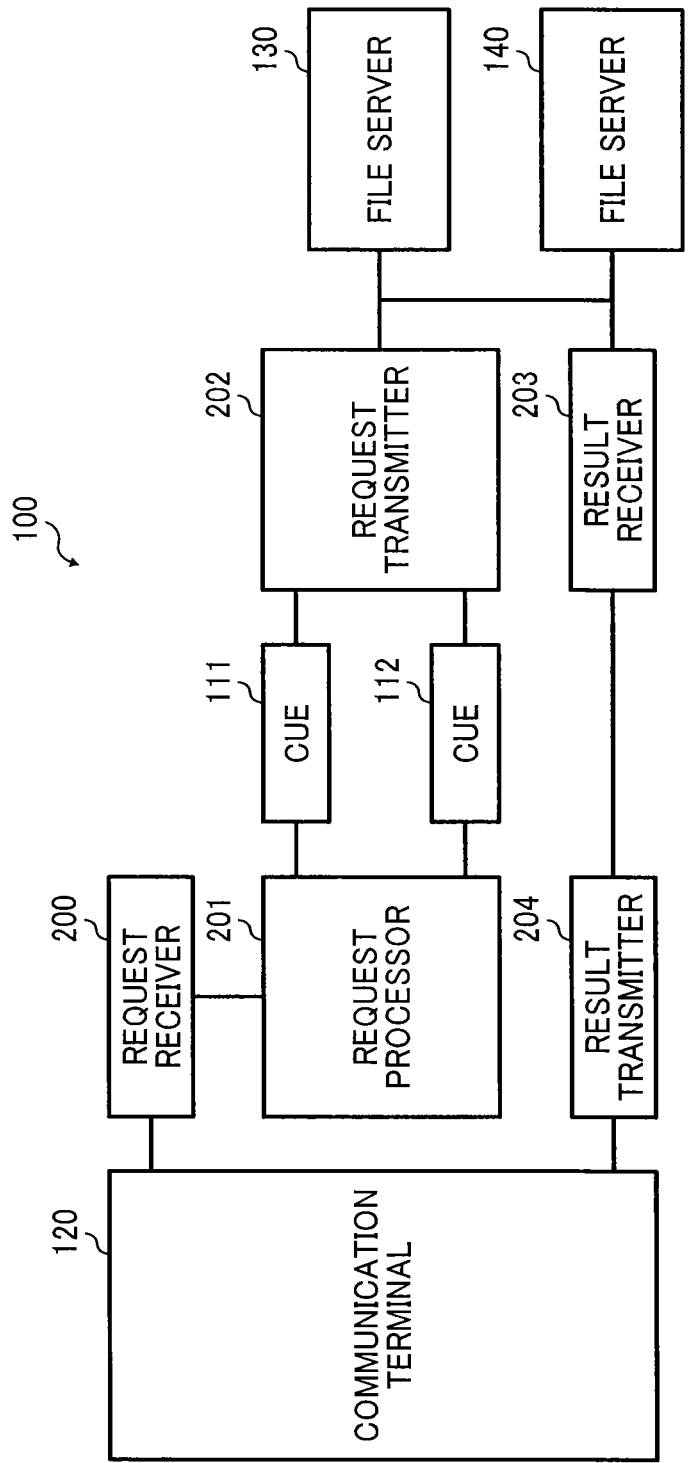
FIG. 6 is a functional block diagram of the information processing system of FIG. 4.

The information processing system 100 includes a plurality of functional units shown in FIG. 6 to devise the above described processing. These functional units can be implemented by executing programs read from the memory using the CPU. The functional units shown in FIG. 6 can be entirely included in the relay server 110 used as a relay apparatus or a part of the functional units can included in the relay server 110 and a remaining part of the functional units are included in other apparatus. The other apparatus may be, for example, PCs, multi-functional peripherals (MFPs), print servers connectable to the global network.

The information processing system 100 includes a request receiver 200 to receive a terminal request including the file server identifier, transmitted from the communication terminal 120

Further, the information processing system 100 includes a request processor 201, which puts the terminal request received by the request receiver 200 to a cue, for example, the cue 111 corresponding to one of file server identifiers included in the terminal request, and accumulates the terminal request. In this example case, two file identifiers (one for the file server 130 and one for the file server 140) are included.

The request processor 201 extracts a plurality of file server identifiers included in the terminal request. The request processor 201 selects one of the file server identifiers by referring the terminal request. The request processor 201 puts the concerned terminal request to the cue 111 used for the file server 130 assigned with the selected file server identifier, and accumulates the concerned terminal request.

The information processing system 100 includes a request transmitter 202, which transmits the terminal request, accumulated in the cue 111 used for the file server 130, to the file server 130 upon receiving an obtaining request from the file server 130.

Further, the information processing system 100 includes a result receiver 203 and a result transmitter 204. The result receiver 203 receives a process result for the concerned terminal request from the file server 130, and the result transmitter 204 transmits the received process result to the communication terminal 120.

Upon receiving the process result from the file server 130, the request processor 201 transfers the terminal request put in the cue 111 to other cue such as the cue 112.

In this process, the request processor 201 compares the file server identifier of the file server 130, from which the result receiver 203 receives a process result, and other file server identifiers included in the terminal request.

Based on this comparison, the request processor 201 deletes a file server identifier matched to the file server identifier of the file server 130 from the terminal request. Then, the request processor 201 puts the terminal request, which has deleted the file server identifier of the file server 130, to the cue 112.

Similarly, upon receiving an obtaining request from the file server 140, the request transmitter 202 transmits the terminal request accumulated in the cue 112 to the file server 140, and the result receiver 203 receives a process result from the file server 140.

Similar to the above, the request processor 201 deletes the file server identifier of the file server 140 from the terminal request. Then, the request processor (201) determines whether the terminal request still includes one or more file server identifiers. In this example case, the request processor 201 determines that the terminal request does not include a file server identifier. If the terminal request does not include a file server identifier, it means a cue for a transfer destination does not exist. Therefore, the request processor 201 deletes the terminal request, and then the result transmitter 204 transmits a process result to the communication terminal 120.

By transmitting the terminal request including file server identifiers of a plurality of file servers and transferring the terminal request to the cues sequentially as described above, files can be transmitted to a plurality of file servers connected to different networks by transmitting the terminal request for one time.

In an example case of FIG. 6, the information processing system 100 includes the file servers 130 and 140, the communication terminal 120, the request receiver 200, the request processor 201, the request transmitter 202, the result receiver 203, and the result transmitter 204. However, the information processing system 100 can include other functional units in addition to the units shown in FIG. 6.

As to communication between the communication terminal 120 and the file server 130 or the file server 140, a paring processing is required at first, in which two apparatuses are paired and registered to register the file servers 130 and 140 as apparatuses that can be accessed from the communication terminal 120.

Figure 7:
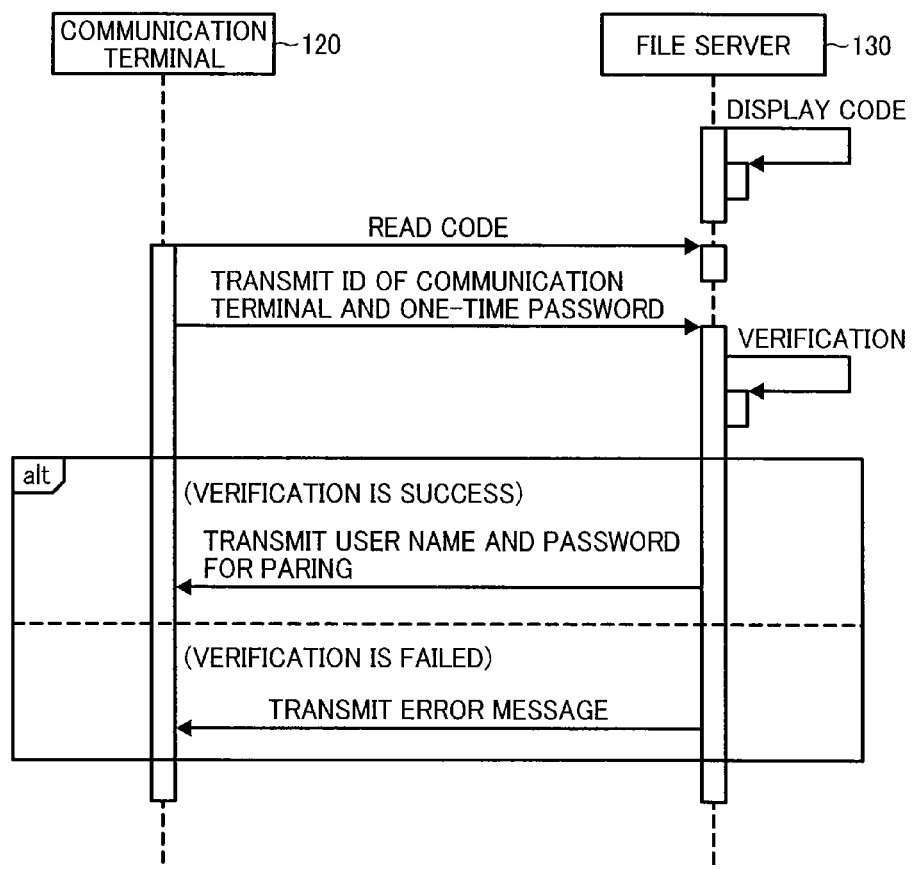
FIG. 7 is a sequential chart when paring a communication terminal and a file server.

FIG. 7 is a sequential chart showing a process of paring. In this example case, an apparatus such as the communication terminal 120 and the file server 130 are paired. For example, code including apparatus information and verification information of a to-be-registered apparatus is displayed on a display unit disposed for the file server 130. The apparatus information includes, for example, QR code (registered trademark) and color code. In this case, the display unit is included in the file server 130, but a personal computer (PC) connected to the file server 130 can be used as the display unit.

Figure 8:
FIG. 8 is an example of a screen displayed when paring with a file server is conducted.

FIG. 8 shows an example screen displayed on the display unit, in which a screen including a code is displayed. The code shown in FIG. 8 includes, for example, information shown in FIG. 9. For example, the information includes server identification (ID) that is a file server identifier of the to-be-registered file server 130, internet protocol (IP) address of the file server 130, address of the relay server 110, verification information such as one-time password. Further, the code may include other information such that a plurality of file servers can be registered, in which one server such as the file server 130 having the above server ID is registered as a main server, and other server such as the file server 140 having the related server ID is registered as a related server, and the server IDs can be included in the code as shown in FIG. 8.

The server ID and related server ID can be characters, symbols, numerals, or a combination of these. The IP address is, for example, "192.168.0.2" as shown in FIG. 8. The address of the relay server 110 is uniform resource locator (URL), uniform resource identifier (URI), or IP address such as "relay.test.co.jp." The one-time password is password that can be used only one time for verification, which can be characters, symbols, numerals such as "0123456789," or a combination of these. The one-time password is not limited thereto. For example, the one-time password can be generated by using manufacturing number and security code registered to the relay server 110, time, or the like.

Figures 9, 10:
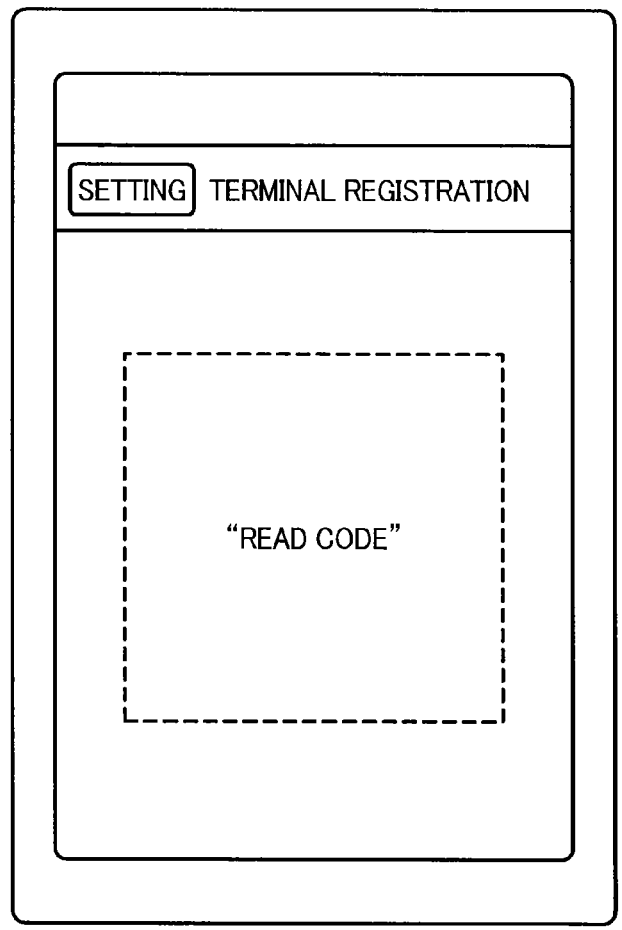
FIG. 9 is an example of contents of a code displayed on a screen.
FIG. 10 is an example of a screen displayed on a communication terminal.

A user can capture a code displayed on the display unit using the communication terminal 120 as shown in FIG. 10. The user operates the communication terminal 120 so that the code displayed on the display unit of the file server 130 exists in a frame displaying "read code" of the communication terminal 120 and then presses a capture button to capture the code.

If the code includes one-time password, the one-time password is transmitted to the file server 130 within a time period set in advance. Only when the file server 130 receives the one-time password within the time period, the verification becomes success. When the verification is success, the file server 130 generates a user name and a password used for access to the communication terminal 120. The user name and password are used when the communication terminal 120 transmits the terminal request.

If the file server 130 does not receives the one-time password within the time period, the verification becomes failed, and the file server 130 transmits an error message to the communication terminal 120.

To devise this processing, in addition to the functional units shown in FIG. 6, the information processing system 100 can further include a display unit to display the code including verification information, wherein the communication terminal 120 can read the code displayed on the display unit.

Further, the information processing system 100 can further include an information determination unit that determines whether verification information received from the communication terminal 120 matches verification information included in the code.

Further, the information processing system 100 can further include a code generator that generates a code using verification information. The code can be generated using specific software such as a code generation tool.

The information processing system 100 can further include an information registration unit. If it is determined that the verification information are matched, the information registration unit registers a plurality of file server identifiers included in the code as file server identifiers of file servers that can communicate with the communication terminal 120.

With this registration, communication can be conduced with a plurality of file servers without knowing information of a plurality of file servers in advance.

Figure 11:
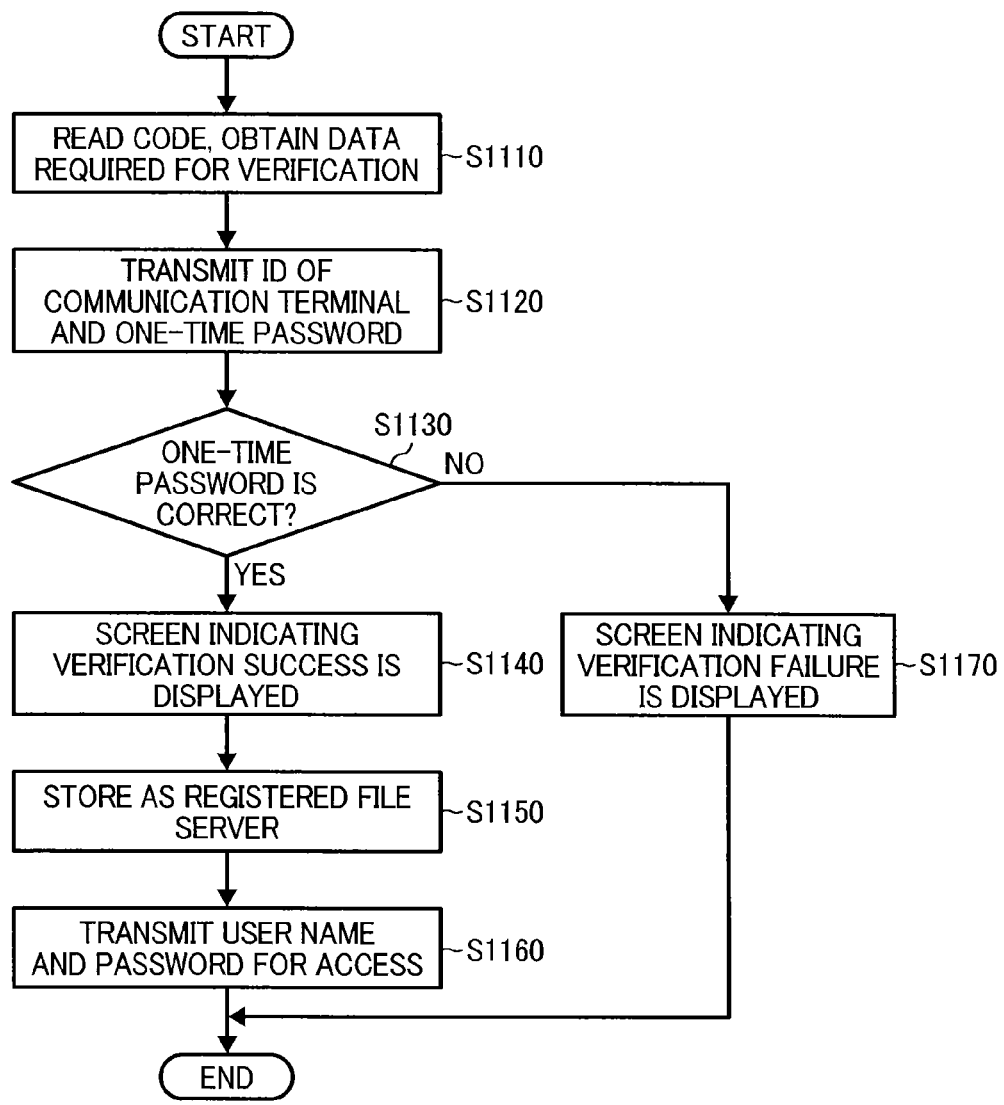
FIG. 11 is a flowchart showing the steps of verification when paring is conducted.

A description is given of a flowchart showing the steps of verification when paring is conducted with reference to FIG. 11. The process starts at step S1100. At step S1110, a code displayed on the display unit is read by the communication terminal 120 to obtain data required for verification. The data required for verification includes verification information such as one-time password. In this example case, the verification information is one-time password, but other information can be used as the verification information.

At step S1120, the ID of the communication terminal 120 and one-time password included in the code are transmitted.

At step S1130, the file server 130 determines whether the one-time password is correct, in which it is determined whether the one-time password included in the code displayed by the file server 130 and the one-time password received from the communication terminal 120 are matched with each other If the verification is success, the process proceeds to step S1140, and if the verification is failed, the process proceeds to step S1170.

At step S1140, a screen indicating verification success is displayed.

At step S1150, a server ID, a related server ID, IP address, address of the relay server 110 obtained by reading the code by using the communication terminal 120 are stored as information of the registered file server.

At step S1160, the file server 130 transmits the user name and password used for access to the communication terminal 120, and the paring process is completed at step S1180.

At step S1170, an error message is reported or transmitted, and a screen indicating the verification failure is displayed. Then, the process proceeds to step S1180, and the paring process is completed.

Figure 12:
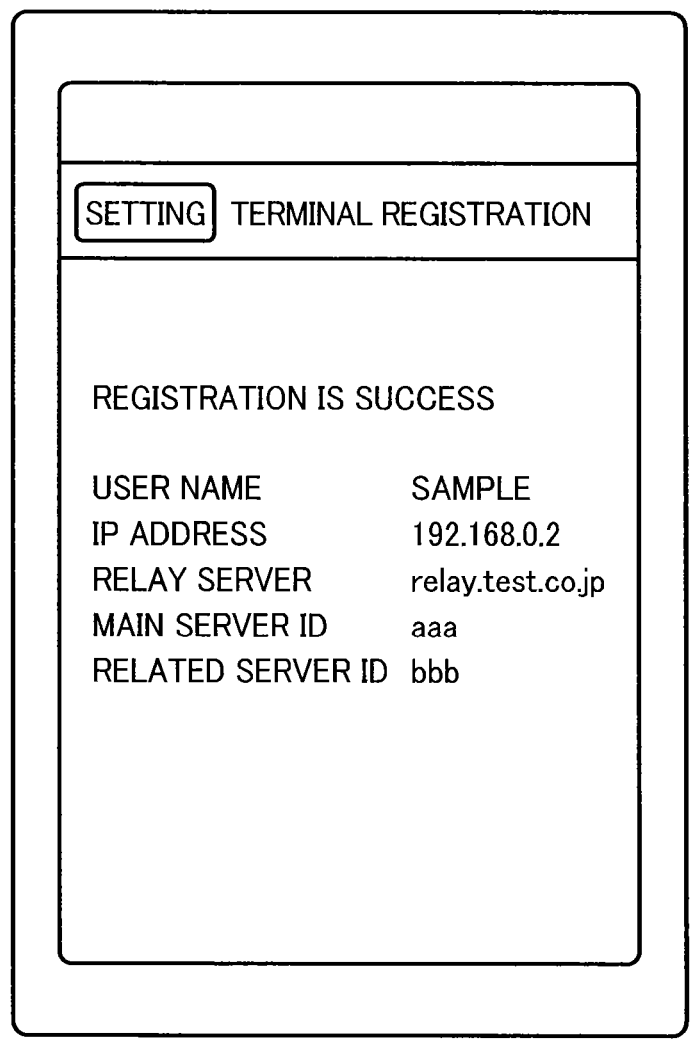
FIG. 12 is an example of a screen displayed on a communication terminal when paring is success.

FIG. 12 is an example screen displayed on the communication terminal 120 when the paring is success. The example screen includes a statement that registration is success, and the user name used for access, server ID, IP address, and related server ID. In the example screen, the password used for access is not included, but the password can be included.

Figure 13:
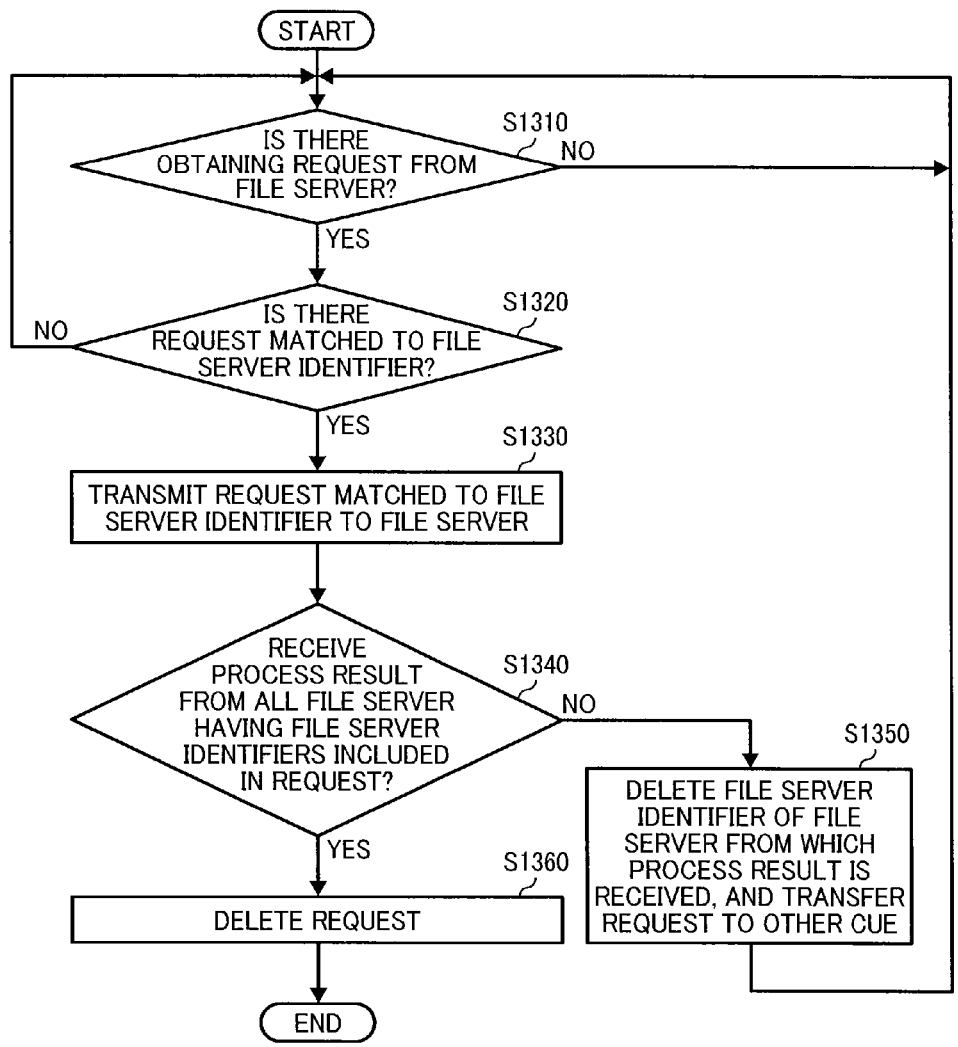
FIG. 13 is a flowchart showing the steps of a process conduct-able by a relay server after receiving a terminal request from a communication terminal.

A description is given of a process conducted by the relay server 110 after receiving the terminal request from the communication terminal 120 with reference to FIG. 13. At step S1300, the process starts. At step S1310, it is determined whether an obtaining request to obtain the terminal request from the file server 130 exist. If the obtaining request does not exist, the determination of step S1310 is repeated until the obtaining request is detected.

If the obtaining request exists, the process proceeds to step S1320, and the relay server 110 determines whether a terminal request matched to the file server identifier of the file server 130 exists.

By referring the cue 111 used for the file server 130 assigned with the ~~€Đ~~ file server identifier, it can determine whether a terminal request matched to the file server identifier of the file server 130 exists. This determination can be conducted using, for example, the request processor 201 shown in FIG. 6.

If the relay server 110 determines that a terminal request matched to the file server identifier of file server 130 does not exist, the process returns to step S1310.

By contrast, if the relay server 110 determines that a terminal request matched to the file server identifier of file server 130 exists, the process proceeds to step S1330, and the request transmitter 202 transmits the terminal request matched to the file server identifier to the file server 130.

At step S1340, it is determined whether a process result is received from all of the file servers identified by the file server identifiers included in the terminal request If a process result is not received from all of the file servers, the process proceeds to step S1350, in which a file server identifier of a file server from which it is determined that a process result is receives, is deleted, and the terminal request is transferred to other cue such as the cue 112. The other cue such as the cue 112 is a cue corresponding one of the file server identifiers included in the terminal request, and for a file server from which a process result is not received If a process result is received from all of the file servers, the process proceeds to step S1360 in which the terminal request is deleted, and the process ends at step S1370.

The information processing system 100 shown in FIG. 6 can include other functional unit such as a request generator, which receives an input from a user, and adds a plurality of file server identifiers registered in the information registration unit to generate a terminal request.

Figure 14:
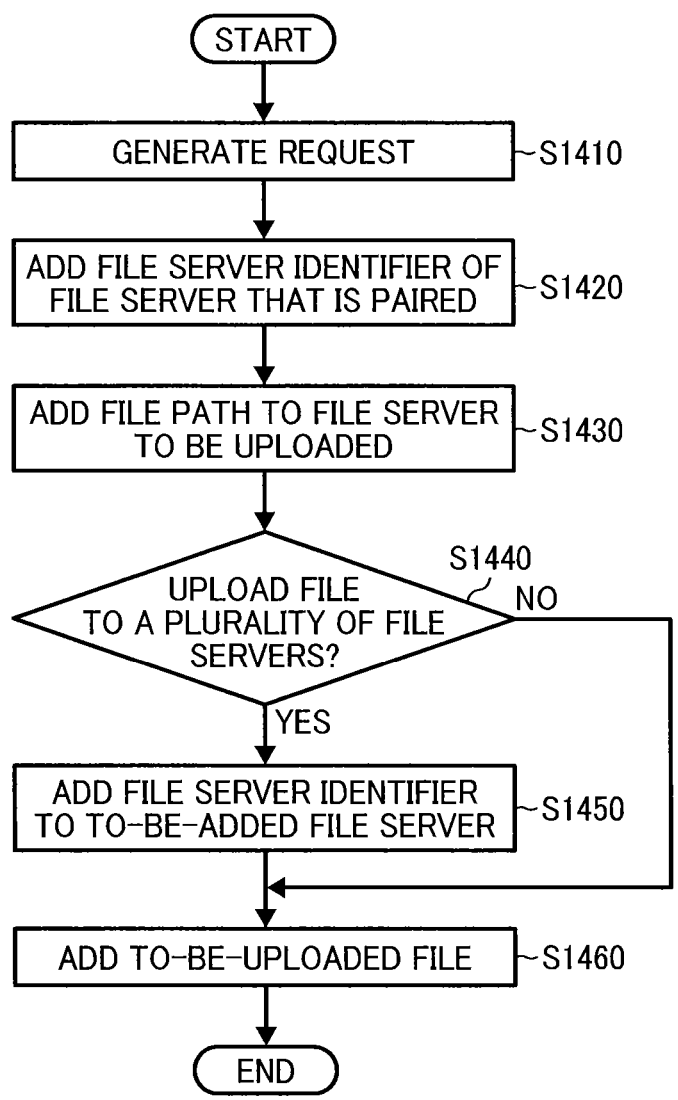
FIG. 14 is a flowchart showing the steps of generating a terminal request.

A description is given of a process of generating a terminal request by the request generator with reference to FIG. 14, which is a flowchart showing the steps of generating a terminal request.

At step S1400, the process starts. At step S1410, an input from a user is received, and then a request is generated. This request is generated, for example, as http request. The http request includes a header and a body. The http request is generated without including a file server identifier in the header and without including a file in the body at this stage.

Specifically, the request is generated by including one ore more upload request messages and user names or the like. The input from the user is, for example, input or selection of the above mentioned user name, input or selection of types of requests such as upload request.

At step S1420, the file server identifier of the file server 130, which is pared, is added to the header. The added file server identifier is the server ID.

At step S1430, a file path to a file serve, which is the upload destination, is added. The file path is, for example, address of the relay server 110, and IP address of the file server 130.

At step S1440, it is determined whether the file is uploaded to a plurality of file servers, wherein this determination can be conducted by checking whether the registered information includes the related server ID.

If the file is uploaded to the plurality of file servers (step S1440: YES), the process proceeds to step S1450, in which a file server identifier of added file server is added, and the process proceeds to step S1460. If the file is not uploaded to the plurality of file servers (step S1440: NO), the process proceeds to step S1460 directly.

At step S1460, a uploading file is added to the body, and the process ends at step S1470. The uploading file is, for example, pictures, images or the like.

The file server identifiers of all file servers included in registered information is not required to be added. For example, only file server identifiers designated by a user in advance can be added.

Figure 15:
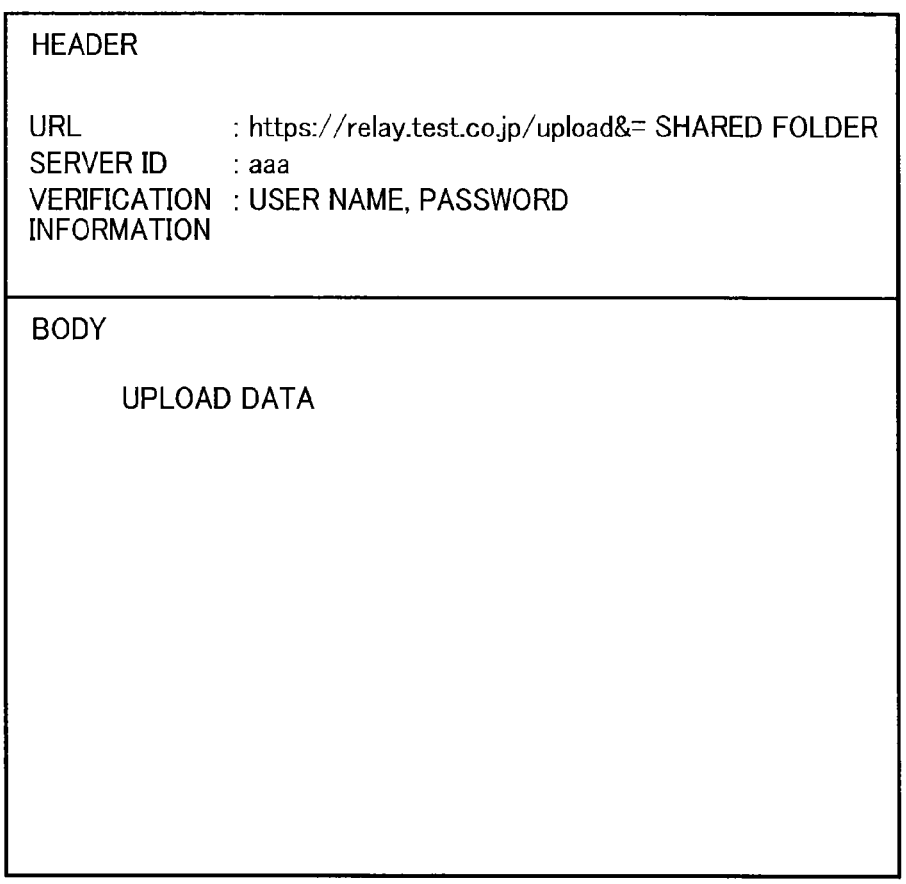
FIG. 15 is an example of contents of upload request.
Figure 16:
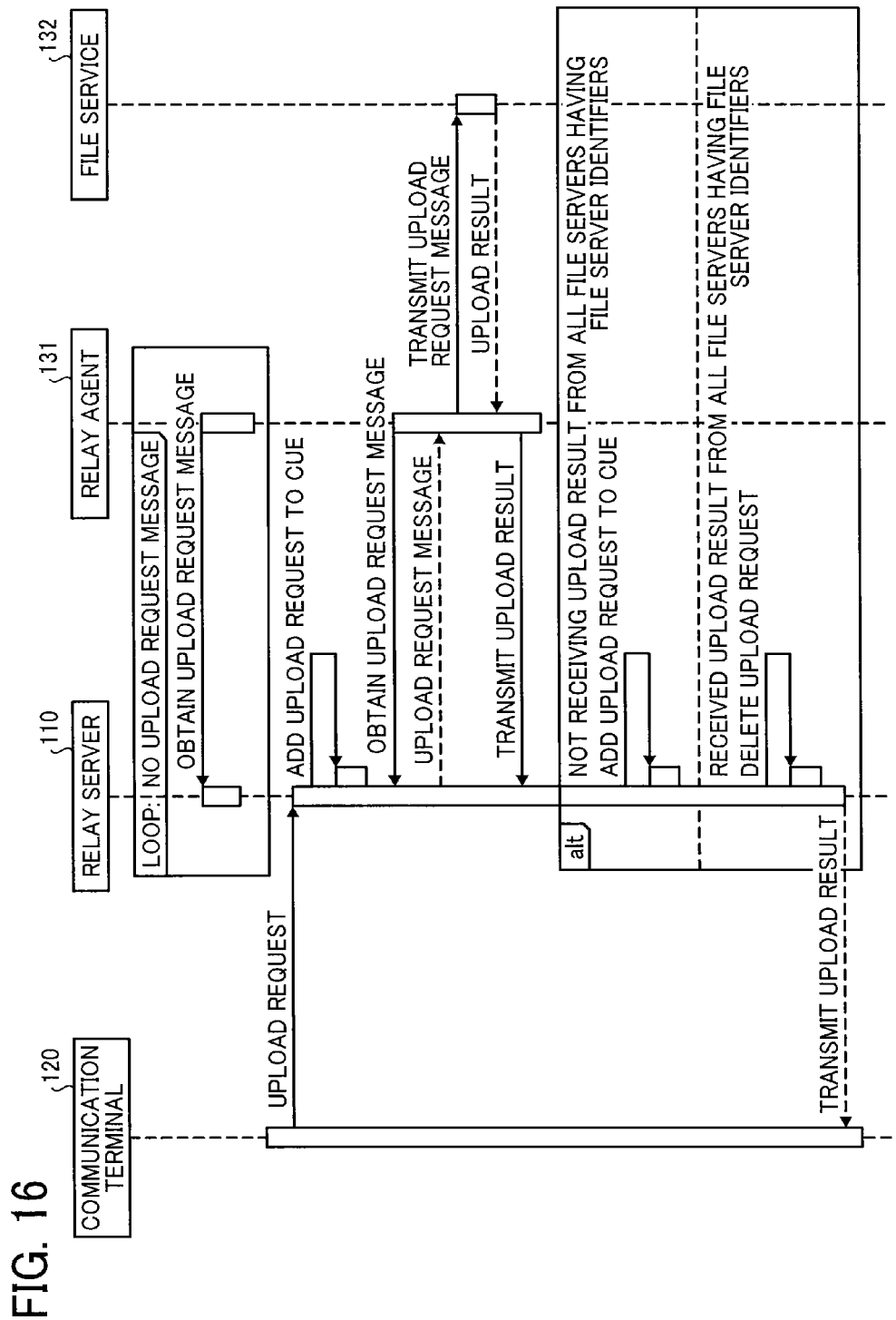

FIG. 15 is an example of contents of upload request. The upload request includes URL that stores a file to be uploaded, a server ID of a file server which is the upload destination, and verification information such as a user name and a password used for access. The server ID is the file server identifier. In this example case, a site that stores a file is indicated by URL, but not limited these. For example, URI, database name or folder name can be used as a site that stores a file FIG. 16 is a sequential chart showing a process of uploading files to a plurality of file servers, in which the relay server 110 receives an obtaining request from the relay agents of the file servers 130 and 140 periodically. A description is given of communication between the communication terminal 120 and the file server 130 for the simplicity of description.

If the relay server 110 does not accumulate an upload request in the cue 111 used for the file server 130, there is no upload requests to be transmitted to the relay agent 131. Therefore, no further processing is conducted.

Upon receiving a upload request from the communication terminal 120, the relay server 110 puts the upload request to the cue 111 used for the file server 130, and waits until receiving an obtaining request from the relay agent 131. Upon receiving the obtaining request from the relay agent 131, the relay server 110 transmits the upload request, put to the cue 111, to the relay agent 131.

Upon receiving the upload request, the relay agent 131 transmits an upload request message to the file service 132, and instructs a given processing. The file service 132 conducts the processing based on the upload request message, and generates a process result and returns the process result to the relay agent 131, in which the process result is an upload result.

The relay agent 131 transmits the upload result, received from the file service 132, to the relay server 110.

If the upload result is not received from the file servers corresponding to all file server identifiers included in the terminal request, the terminal request is transferred from the cue 111 used for the file server 130 to a cue used for a file server from which not yet receiving the upload result. In this process, the file server identifier of the file server 130 from which receiving the upload result is deleted from the terminal request, and then the terminal request is put into the cue from which not yet receiving the upload result. Then, the relay server 110 waits an obtaining request from the file server from which not yet receiving the upload result.

When the relay server 110 receives the upload result from all of the file servers corresponding to the file server identifiers included in the terminal request, the relay server 110 deletes the upload request. After the deletion, the relay server 110 transmits the upload result corresponding to the upload request to the communication terminal 120.

FIG. 17 is an example of the contents of upload request when uploading to a plurality of file servers. The upload request includes URL that stores a file to be uploaded, a server ID of a file server which is the upload destination, and verification information such as a user name and a password used for access. The server ID is the file server identifier. In this example case, a site that stores a file is indicated by URL, but not limited these. For example, URI, database name or folder name can be used as a site that stores a file.

In a case of FIG. 15, only the server ID is included, but in a case of FIG. 17, a plurality of related server IDs is included because a file is uploaded to a plurality of file servers. For example, file server identifiers of one server ID and two related server IDs (i.e., three file servers) are included.

The number of related server IDs is not limited two, but one, three or more related server IDs can be used. The header can include the server ID, user name and other information.

The above described example embodiment can be applied to a relay apparatus, an information processing system and program, with which a file can be transmitted to a plurality of apparatuses connected to different networks by conducting a user operation transmitting the terminal request for one time. Because the user operation is conducted for one time only, the user operation can become easy and a user load can be reduced.

Further, by deleting information of the apparatus which has competed the processing, an error such as putting information to the same cue two times can be prevented. Further, if apparatus identification information is not included, the terminal request can be automatically deleted, with which a situation that the terminal request is put into any one of cues can be prevented, and information security can be secured.

Further, by reading a code such as two dimensional code, a situation that unrelated persons can see information of file servers can be prevented. Further, the code includes the verification information, and the verification becomes success when the verification information is received with a given time period. With this configuration, information security can be secured.

In the above described example embodiment, files can be transmitted from communication terminals to a plurality of apparatuses connectable via different networks with less user operations.

The program can be distributed by storing the program in a storage medium or carrier medium such as CD-ROM. Further, the program can be distributed by transmitting signals from a given transmission device via a transmission medium such as communication line or network (e.g., public phone line, specific line) and receiving the signals. When transmitting signals, a part of data of the program is transmitted in the transmission medium, which means, entire data of the program is not required to be on in the transmission medium. The signal for transmitting the program is a given carrier wave of data signal including the program. Further, the program can be distributed from a given transmission device by transmitting data of program continually or intermittently.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium, carrier medium, carrier means, or digital data carrier for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic Tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/software combination. In example embodiment, processing units, computing units, or controllers can be configured with using various types of processors, circuits, or the like such as a programmed processor, a circuit, an application specific integrated circuit (ASIC), used singly or in combination.

Although the relay apparatus, information processing system and program are described as the example embodiment, numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An information processing system including a plurality of apparatuses connectable via different networks, the information processing system comprising:
    a request receiver to receive a terminal request including a plurality of apparatus identification information, transmitted from a communication terminal, the apparatus identification information being used for identifying each of the plurality of apparatuses;
    a request processor to accumulate the received terminal request into one of a plurality of request accumulation units that corresponds to one of the apparatus identification information included in the terminal request;
    a request transmitter to, in response to receiving an obtaining request for obtaining a terminal request from an apparatus identified by the apparatus identification information, transmit the terminal request accumulated in the request accumulation unit to the apparatus;
    a result receiver to receive a process result of the terminal request from the apparatus; and
    a result transmitter to transmit the received process result to the communication terminal,
    wherein, among the plurality of apparatus identification information included in the terminal request, the request processor compares the plurality of apparatus identification information, and specific apparatus identification information of a first apparatus from which a process result is received, deletes apparatus identification information that matches the specific apparatus identification information, from the terminal request, and transfers the terminal request from a first request accumulation unit corresponding to apparatus identification information of the first apparatus, from which the process result is received, to a second request accumulation unit corresponding to apparatus identification information of a second apparatus, from which a process result is not yet received.

2. The information processing system of claim 1, wherein the request processor determines whether the terminal request includes apparatus identification information, and when the request processor determines that the terminal request does not include apparatus identification information, the request processor deletes the terminal request.

3. The information processing system of claim 1, further comprising:
    a display unit configured to display a code including verification information readable by the communication terminal; and
    an information determination unit configured to receive verification information from the communication terminal, and determines whether the received verification information matches verification information included in the code.

4. The information processing system of claim 3, further comprising a code generator to generate the code using the verification information.

5. The information processing system of claim 3, wherein the code includes a plurality of apparatus identification information used for identifying the plurality of apparatuses, the system further comprising:
    an information registration unit to register apparatus identification information of a plurality of apparatuses included in the code as apparatus identification information of a plurality of apparatuses that can communicate with the communication terminal, when the information determination unit determines that the verification information received from the communication terminal matches the verification information included in the code.

6. The information processing system of claim 5, further comprising a request generator to generate the terminal request by adding, a plurality of apparatus identification information registered in the information registration unit based on an input to the information processing system.

7. A relay apparatus for relaying communication between a plurality of apparatuses and a plurality of communication terminals connectable via different networks, the relay apparatus comprising:
    a request receiver to receive a terminal request including a plurality of apparatus identification information, transmitted from the communication terminals, used for identifying each of the plurality of apparatuses;
    a request processor to accumulate the received terminal request into a request accumulation unit corresponding to one of the plurality of apparatus identification information included in the terminal request;
    a request transmitter, upon receiving an obtaining request for obtaining a terminal request from an apparatus identified by the apparatus identification information, to transmit the terminal request accumulated in the request accumulation unit to the apparatus;
    a result receiver to receive a process result for the terminal request from the apparatus; and
    a result transmitter to transmit the received process result to the communication terminals,
    wherein, among the plurality of apparatus identification information included in the terminal request, the request processor compares the plurality of apparatus identification information, and specific apparatus identification information of a first apparatus from which a process result is received, deletes apparatus identification information matched to the specific apparatus identification information, from the terminal request, and transfers the terminal request from a first request accumulation unit corresponding to apparatus identification information of the first apparatus, from which the process result is received to a second request accumulation unit corresponding to apparatus identification information of a second apparatus, from which a process result is not yet received.

8. The relay apparatus of claim 7, wherein the request processor determines whether the terminal request includes apparatus identification information, and when the request processor determines that the terminal request does not include apparatus identification information, the request processor deletes the terminal request.

9. A method of relaying communication between a plurality of apparatuses and a plurality of communication terminals connectable via different networks, the method comprising the steps of:
- receiving a terminal request including a plurality of apparatus identification information, transmitted from the communication terminals, used for identifying each of the plurality of apparatuses;
- accumulating the received terminal request into a request accumulation unit corresponding to one of the apparatus identification information included in the terminal request;
- transmitting the terminal request accumulated in the request accumulation unit, upon receiving an obtaining request for obtaining a terminal request from an apparatus identified by the apparatus identification information, to the apparatus;
- receiving a process result for the terminal request from the apparatus (receiving apparatus;
- transmitting the received process result to at least one of the communication terminals;
- among the plurality of apparatus identification information included in the terminal request, comparing the plurality of apparatus identification information included in the terminal request, and specific apparatus identification information of a first apparatus from which a process result is received;
- deleting apparatus identification information matched to the specific apparatus identification information, from the terminal request; and
- transferring the terminal request from a first request accumulation unit corresponding to apparatus identification information of the first apparatus, from which the process result is received, to a second request accumulation unit corresponding to apparatus identification information of a second apparatus, from which a process result is not yet received.

10. The method of claim 9, further comprising the steps of determining whether the terminal request includes apparatus identification information; and deleting the terminal request when it is determined that the terminal request does not include apparatus identification information.

\* \* \* \* \*